United States Patent [19]

Thompson

[11] Patent Number: 5,046,475
[45] Date of Patent: Sep. 10, 1991

[54] EMISSION CONTROL DEVICE FOR CARBURETED ENGINES

[75] Inventor: Richard W. Thompson, Tujunga, Calif.

[73] Assignee: Thompson Devices, Inc., Glendale, Calif.

[21] Appl. No.: 583,876

[22] Filed: Sep. 14, 1990

[51] Int. Cl.$^5$ .............................. F02M 23/00
[52] U.S. Cl. ................... 123/585; 123/587; 123/590; 261/64.1; 48/189.3
[58] Field of Search ............ 123/585, 587, 590; 48/189.3; 261/64.1, DIG. 1

[56] References Cited

U.S. PATENT DOCUMENTS

| | | | |
|---|---|---|---|
| 3,077,391 | 2/1963 | Guffra | 123/590 |
| 4,137,875 | 2/1979 | Medina | 123/585 |
| 4,215,663 | 8/1980 | Gaylord | 123/590 |
| 4,355,623 | 10/1982 | Graham | 123/585 |
| 4,373,500 | 2/1983 | Haynes | 123/587 |

*Primary Examiner*—Andrew M. Dolinar
*Assistant Examiner*—M. Macy
*Attorney, Agent, or Firm*—Ladas & Parry

[57] ABSTRACT

Disclosed herein is an emission control device for use with a carburetor having a base and at least one fuel opening defined in its base. The device is comprised of a body member of predetermined thickness and defining therein at least one through opening. The through opening communicates with the fuel opening in the carburetor. The device also has an air passageway largely defined in its surface. The air passageway communicates with the through opening. The passageway lies generally adjacent the carburetor and the fuel opening so that air passed through the passageway passes into the through opening and under the fuel opening.

42 Claims, 4 Drawing Sheets

EMISSION CONTROL DEVICE FOR CARBURETED ENGINES

BACKGROUND OF THE INVENTION

This invention relates to an auxiliary device for use between a carburetor and an intake manifold of an internal combustion engine. While the device is shown as an auxiliary device, in fact, the carburetor could be manufactured to include the device at its end which lies closest to the intake manifold.

Known in the art is a plurality of fuel saver devices for use with internal combustion engines and the reader may wish to review the following patents.

U.S. Pat. No. 4,355,623 issued to Graham on Oct. 26, 1982.

U.S. Pat. No. 4,137,875 issued to Medina on Feb. 6, 1979.

U.S. Pat. No. 3,996,315 issued to Herail on Dec. 7, 1976.

U.S. Pat. No. 3,973,534 issued to Amos on Aug. 10, 1976.

U.S. Pat. No. 3,946,710 issued to Albano on Mar. 30, 1976.

U.S. Pat. No. 3,943,900 issued to Primrose on Mar. 16, 1976.

U.S. Pat. No. 3,414,242 issued to Bouteleux on Dec. 3, 1968.

U.S. Pat. No. 2,377,852 issued to Blifffert on June 12, 1945.

U.S. Pat. No. 1,942,187 issued to Ruffino on Jan. 2, 1934.

U.S. Pat. No. 1,748,203 issued to Brunelle on Feb. 25, 1930.

U.S. Pat. No. 1,118,865 issued to Johnston and Cooper on Nov. 24, 1914.

The most pertinent of these patents with respect to the present invention is the patent to Graham. In the Graham patent an auxiliary device is sandwiched between the carburetor and the manifold. The auxiliary device has a central opening which corresponds in size with that of the manifold and carburetor openings. In communication with this central opening are two air inlet lines. These lines pass through the body of the auxiliary device and open at a 45 degree angle to the central opening of the auxiliary device. The air inlet openings communicate with yet other openings that pass through the body of the auxiliary device and carry therein a threaded member. The air passing through the openings in the body into the central opening impinges against the threaded members. This creates an amount of turbulence which is said to cause any unhomogenized droplets of fuel to be broken up and dispersed throughout the existing mixture.

SUMMARY OF THE INVENTION

Disclosed herein is an emission control device for use with a carburetor having a base, at least one opening defined in its base, and a fuel passageway opening which communicates with the opening in the base, the device comprising:

a body member of predetermined thickness having an upper surface and defining therein at least one through opening, said through opening communicating with said at least one opening in said base, and an air passageway defined in the upper surface of said body member, said air passageway communicating with said through opening, said air passageway lying generally adjacent said base and said opening so that air passed through said air passageway passes into said through opening by passing first under said fuel passageway opening.

BRIEF DESCRIPTION OF THE DRAWINGS

The present invention is better appreciated when discussed with respect to the following drawings.

FIG. 1 is an exploded view of a two barrel, single stage, internal combustion engine with the present invention inserted therein.

DESCRIPTION OF THE PREFERRED EMBODIMENTS

FIG. 1 is an exploded view of an internal two barrel, single stage, combustion engine. It is broadly comprised of a typical engine intake manifold 100 having two through openings 104 located generally centrally in the top surface of intake manifold 100. At four corners and surrounding through openings 104, are connecting holes 102.

First gasket 200 with two through openings 204 is fitted on top of intake manifold 100. Through openings 204 are seen to be generally centrally located in first gasket 200 and are surrounded by four connecting holes 202. Securement holes 202 may be said to be near the corners of first gasket 200. Through openings 104 and 204 register with each other as do connecting holes 102 and 202 when first gasket 200 lies against the top surface of manifold 100.

Above first gasket 200, is the present invention, emission control device 300. Emission control device 300 defines generally centrally within its body two through openings 304. These will register with through openings 204 of first gasket 200. Around through openings 304 and generally at the corners of emission control device 300 are connecting holes 308. Securement holes 308 will register with connecting holes 202 when emission control device 300 is placed against first gasket 200.

Directly above emission control device 300, is second gasket 200'. Second gasket 200' has essentially the same construction as first gasket 200. Therefore its through openings 204' and connecting holes 202' will register with the through openings 304 and connecting holes 308 of emission control device 300, when emission control device 300 and second gasket 200' are placed adjacent one another.

Above second gasket 200' is located two-barrel carburetor 400. Carburetor 400 defines in its base connecting holes 402 which register with connecting holes 202' of the second gasket. With the connecting holes of all parts registering as described above, pin 50 can be passed through all of the connecting holes to hold in serial relationship manifold 100, first gasket 200, emission control device 300, second gasket 200', and carburetor 400.

Figure 3:
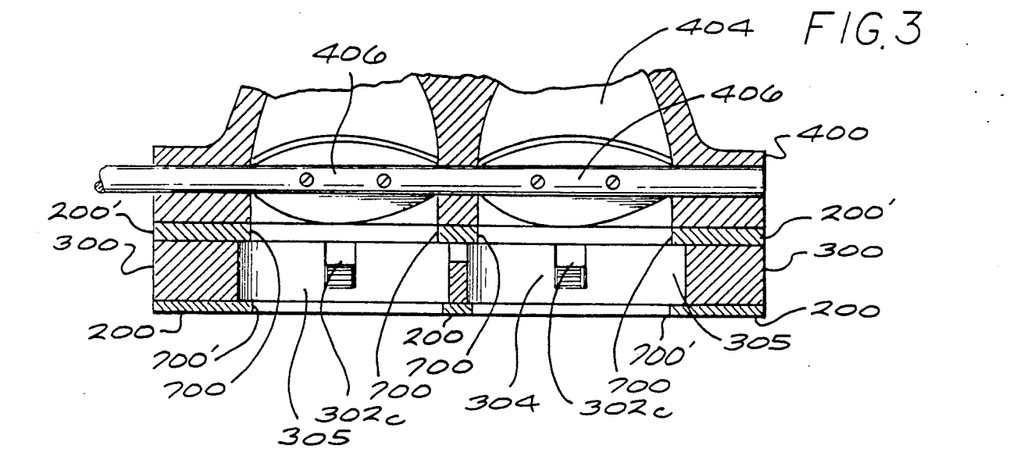
FIG. 3 is a sectional and diagrammatic view taken through the present invention, a portion of a carburetor, and a first and second gasket.

Carburetor 400 contains two openings 404 which are best seen in FIG. 3. These openings register with openings 202' of second gasket 200' so that when pin 50 is placed through all of the connecting holes noted above, all of the through holes 104, 204, 304, 204' are in fluid communication with each other and openings 404 of carburetor 400.

Above carburetor 400 is air cleaner 600 which connects to carburetor 400 in a known fashion. Emission control device 300 is connected to air cleaner 600 by means of tubing 500 and needle or other valve 502 so that air from air cleaner 600 is directly fed into emission control device 300.

Figure 2:
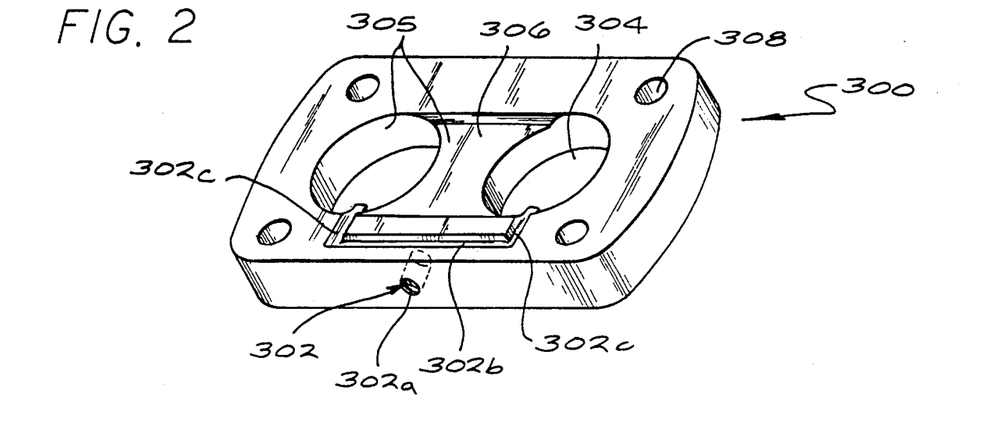
FIG. 2 is an enlarged perspective view of a first embodiment of the present invention.

Turning to FIG. 2, emission control device 300 of FIG. 1 may be seen in greater detail. Emission control device 300 is generally rectangular in shape. In its upper surface are indentations defining air passageways 302 and 306 which are in fluid communication with two through holes 304. The sides of air passageways 302 and 306 may be angled, or curved as they meet the bases of these passageways. Through holes 304 are shown to be symmetrically arranged with respect to the edges of emission control device 300 and pass completely through emission control device 300. The combination of through holes 304 and air passageway 306 is centrally located within emission control device 300.

Air passageway 302 is shown to be comprised of essentially three sections, 302a, 302b, and 302c which are all in fluid communication with each other. Central outside communication bore 302a is carved into an edge of emission control device 300 and extends at right angles thereto. Central outside communication bore 302a lies in the middle of and extends at right angles to section 302b which extends longitudinally and in parallel with the edge of emission control device 300. Section 302b is defined in the surface of emission control device 300 and is an indentation therein. It is spaced from the edge of emission control device 300 and spaced from through openings 304 and air passageway 306.

Central outside communication bore 302a also lies between through openings 304 and generally centrally of air passageway 306. As can be seen in FIG. 2, while bore 302a begins under the upper surface of emission control device 300, it breaks through into the surface to become an indentation therein and a part of section 302b. Bore 302a may be threaded in its internal surface to connect with connecting means which place it in fluid communication with tubing 500 and thus air cleaner 600. On the other hand, it may include a cast in boss for receiving and holding tubing 500.

Breaking away from longitudinal extension 302b are outlets 302c which are seen in FIG. 2 to extend at right angles from section 302b and to be in fluid communication with through openings 304. Outlets 302c are also generally indentations in the surface of emission control device 300. They are directed toward the central axis "+" of through openings 304. Thus, outlets 302c could as well angle in their approach to through openings 304 as long as they are directed toward the central axis + of through openings 304.

As can be seen in FIG. 2, air passageways 302b, 302c and 306 are formed in the surface of emission control device 300 causing the surface level to drop at these points. Bore 302a must be centrally located with respect to sections 302b and 302c so that sections 302b and 302c are symmetrically arranged with respect to bore 302a. However, section 302b does not need to extend in parallel with the edge of emission control device 300 nor at a right angle with respect to opening 302a. As noted above, sections 302c need not lie at right angles to section 302b. It is only important that sections 302c are directed toward the central axis + of through openings 304.

Air passageway 306 lies between through openings 304. It is physically separate from air passageway 302. Air passageway 306 is shown to be equal in width to the diameters of through openings 304. However, this is merely preferable and air passageway 306 could be of a lesser width. The depth of air passageway 306 is seen to be the same as the depth of air passageway 302. However, this is not necessarily required. Also shown in FIG. 2 and discussed above, are connecting holes 308 for receiving pins 50.

The cross-sectional area of each of outlets 302c is less than the cross-sectional area of each of bore 302a and air passageway 302b. The cross-sectional area of bore 302a must be greater than that of one outlet 302c. The same is true with respect to section 302b. It must have a cross-sectional area that is greater than that of one outlet 302c.

The diameter of each through hole 304 is greater than the diameter of each carburetor opening 404 and each second gasket through opening 202'. It is also greater than each of the openings 204, 104 in the first gasket 200 and the manifold 100 respectively. FIG. 3 discloses this relationship.

In FIG. 3, a sectional and diagrammatic view of the interrelationship between emission control device 300, carburetor 400, and first and second gaskets 200 and 200' is shown. Because of the increased diameter of through opening 304 to carburetor opening 404 and through opening 202' defined in second gasket 200', a ledge 700 is formed. This ledge is formed by the walls of second gasket 200', and carburetor 400 which define through openings 202' and 404 respectively. A similar ledge 700' is created between the through opening 304 in emission control device 300 and through opening 202 in first gasket 200.

FIG. 3 also shows throttle 406 in carburetor 400 as located within opening 404. Throttle 406 lies above through openings 202' and 304 of second gasket 200' and emission control device 300 respectively. The significance of this interrelationship is discussed further in this description.

Figure 4:
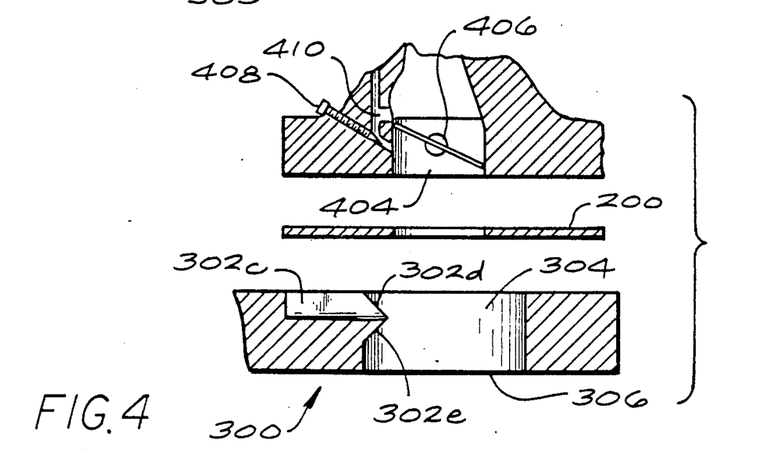
FIG. 4 is an exploded sectional diagrammatic view of the present invention as taken through one through opening and outlet of the invention and one carburetor opening.

FIG. 4 is an exploded view. In FIG. 4, a sectional and partially diagrammatic view through outlet 302c, one through opening 304, and one carburetor opening 404 is seen. Here, air passageway 302 at its outlet 302c is clearly seen. In the forming of emission control device 300 with outlet 302c, an upper side lip 302d is formed. As can be seen, air passageway 302 extends beyond the wall defining through opening 304. Thus outlet 302c extends within the diameter of through opening 304. In its extension into through opening 304 it defines upper side lip 302d and lower full lip 302e. Lower full lip 302e extends from the base of outlet 302c and curves toward the sides which define through opening 304. Thus in cross-section, it is somewhat triangular in shape as it tapers inwardly from the base end of outlet 302c to the sides that define through opening 304. This lip section is not mandatory.

Upper side lip 302d extends from the base of opening 302c and angles upwardly toward the sides which define the outer edge of through opening 304 so that it too forms a triangular shape when viewed from a side. Thus upper side lip 302d is seen to extend at a first length from the base of opening 302c but to angle to the top of 302c so there is no extension from the top of section 302c into through opening 304. This forms a curved or triangular extension along the side edges of outlet 302c. Upper side lip 302d and the end of outlet 302c preferably extend into through opening 304 far enough to align with the side edges which define opening 404 in carburetor 400. However, they may extend further toward the center of opening 404. While lip formation 302d is preferable, it is not required in the present invention.

Also seen in FIG. 4 in carburetor 400, is mid-speed fuel air port 410 which communicates with and is to the side of opening 400. Idle 408 works with port 410, opening 400, and throttle 406 in a known manner. Idle 408 is located within air port 410.

With an appreciation of the formation of the present invention, the function of this invention can be better understood. Air is brought through air cleaner 600 and filtered there. It passes into line 500 and through needle valve 502. Here it enters bore 302a and passes through air passageway 302b and out opening 302c into through openings 304. It also passes across air passageway 306 to allow a pulsing of sorts between outlets 302c. Because air passageways 302 and 306 are formed in the surface of emission control device 300 (with the exception of bore 302a) they are separated from carburetor 400 only by second gasket 200. This provides air coming out immediately under the base of carburetor 400. This is important in view of the fact that the throttle 406 of a carburetor is at its base and that the idle 408 and mid-speed fuel-air ports 410 (FIG. 4) (hereinafter referred to as fuel passages and known in the art as fuel ports) have air/fuel flows which are at and immediately below the throttle 406. The closer the throttles are to the air being passed into through openings 304 the more effective the device. In this way, the fuel is mixed with the air immediately as it exits into the airstream instead of having a delay time as occurs in the devices in which the air passages are in the body of the emission control device. It is believed that this increases the throttle response and changes the emission output. This occurs during steady throttle states and during slow to rapid throttle movement as vacuum and air flow vary.

Thus, it is significant that outlets 302c be preferably directly under the fuel passages 408, 410 of carburetor 400. The positioning of air outlets 302c will vary depending upon the carburetor used in order to place outlets 302c directly under fuel passages of a specific brand and model. Further, and as noted above, outlets 302c have to exit in line with and directed toward the central axis + of through openings 304. However, outlets 302c could angle upwardly toward openings 404 as they are directed toward the central axis + of through openings 304. It is merely preferred that they do not angle away, that is downwardly from openings 304. They are shown in the drawings as parallel to these openings. It is preferred that there be no turbulence or obstruction (or reduction in cross-sectional area) which would affect the air flow between valve 502 and outlets 302c. It is preferred that between valve 502 and outlets 302c the only vacuum drop which occurs be at valve 502 and outlets 302c. Outlet 302c thus, should preferably be the smallest cross-sectional area in the air passageways 302, 306 with outlet 302c being tapered toward the actual exit point to form a venturi. With this clear and unobstructed opening into through openings 304, it is believed that the air passes into through openings 304 with the highest amount of velocity. Trying to cause turbulence, at the air opening with threaded members or blade tips, is not desired as it is believed that it diminishes the effectiveness of the device. When speaking of 302c's smallest cross-sectional area, the area being discussed is the end and near end of passageway 302 where it enters into through openings 304.

Second, it is important that outlets 302c be of equal distance from bore 302a and from the center of air passageway 306. This is because of the air pulsations that occur between outlets 302c by means of air passageway 306. These air pulsations occur as the intake valves in the cylinder head, or heads of the engine open and close.

Outlets 302c must be under the idle 408 and off idle (mid speed) ports 410 of the carburetor. Preferably, outlets 302c are an eighth of an inch or less away from the idle ports 410 although they could be located at greater distances. However the closer outlets 302c are to idle ports 410, the better. Second gasket 200' prevents passages 302a, 302b, and 302c from contacting the bottom surface of carburetor 400. However second gasket 200' is thin enough to allow emissions device 300 to be as close as possible to the carburetor 400. Second gasket 200' could be omitted by forming carburetor 400 with emission control device 300. Then, outlets 302c could be even closer to idle ports 410.

Figures 7, 8, 9:
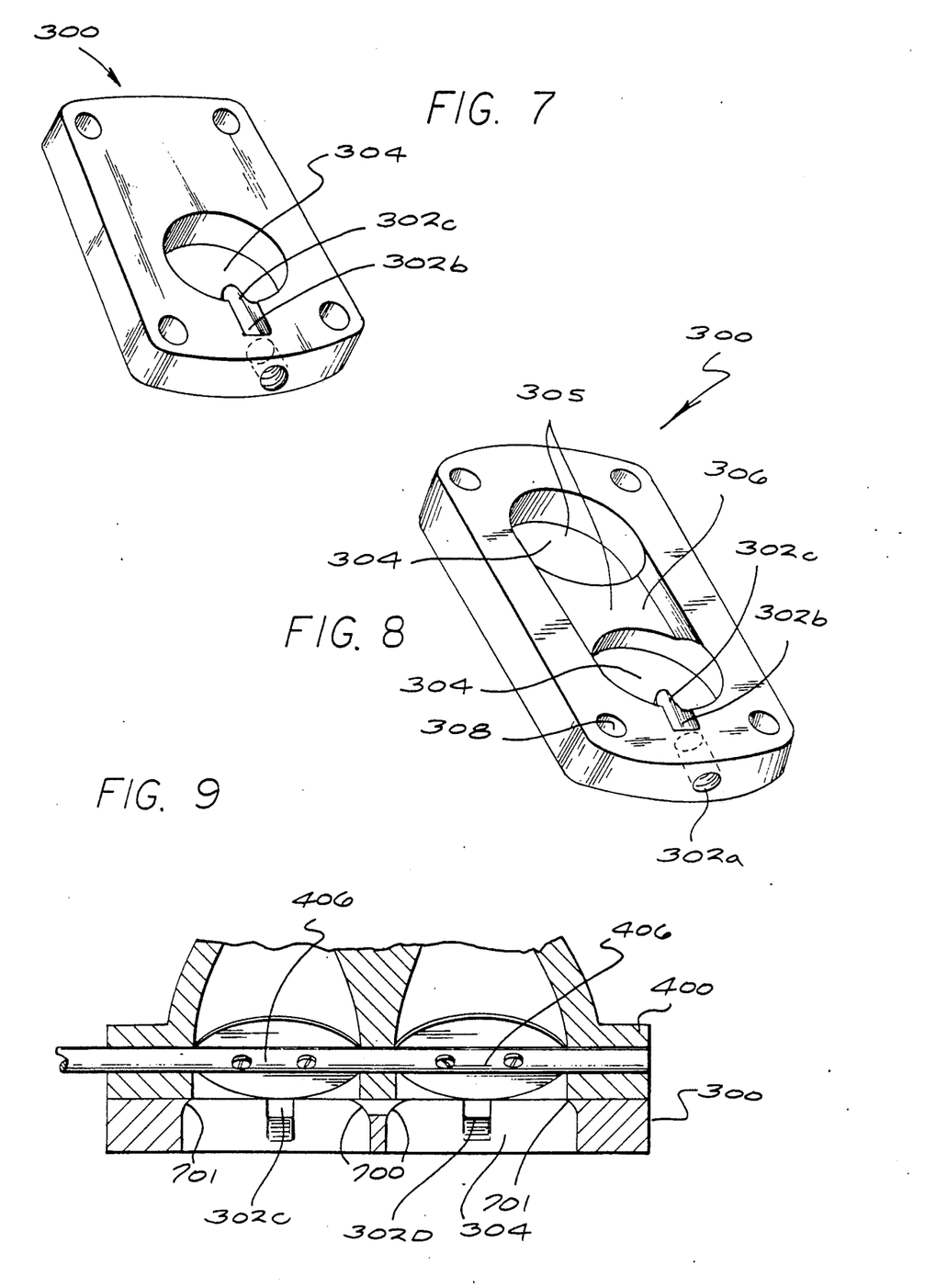
FIG. 7 is a perspective view of the present invention for use with a single throttle, single barrel carburetor.
FIG. 8 is a perspective view of the present invention as modified for use with a two barrel, two stage carburetor.
FIG. 9 is a modified version of the present invention.

The diameter of through openings 304 is greater than the diameters of the similar openings 404 in carburetor 400. This was discussed and shown with respect to FIG. 3. Preferably, the diameter of through opening 304 is at least 1/5 of an inch larger than the diameter of opening 404 of carburetor 400. This is to create a cavity 305 between each through hole 304 and the gaskets 200, 200' and the carburetor 400 and manifold 100. It also forms ledge 700 and 700'. If emission control device 300 were formed as a part of carburetor 400, then in machining, molding or die casting the two together, the ledge 700 could still be formed. It is believed that by having ledge 700 between the carburetor 400 and the emission control device 300, the homogenization of the air/fuel mixture and unsuspended fuel is enhanced. Ledge 700 is also believed to facilitate variations in throttle position, engine load, vacuum changes and unsuspended fuel film which forms on the carburetor bore 404 from the accelerator pump discharge. If carburetor 400 is formed with emission control device 300, ledge 700 may or may not be included. In FIG. 9 a cross-sectional view of a carburetor 400 formed with an emission control device 300 is shown. While ledge 700 is present in this drawing, it is shown to be triangular in form and is thus numbered 701 since it differs from ledge 700 earlier shown. It could as well take on a curved shape.

Figure 5:
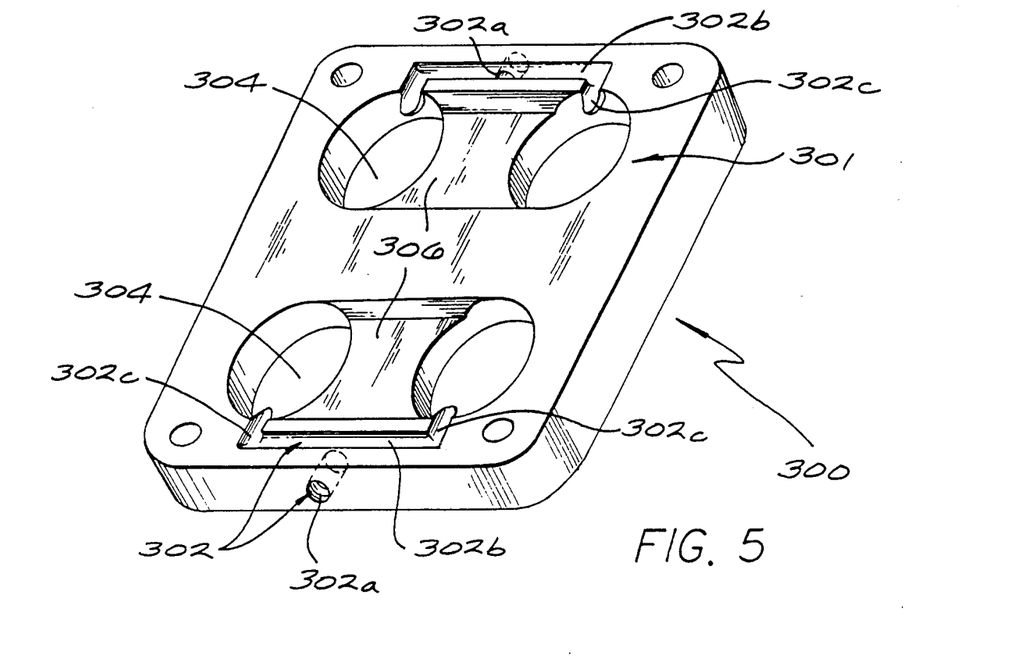
FIG. 5 is a perspective view of the present invention as modified for use with a four barrel carburetor with an idle circuit.
Figure 6:
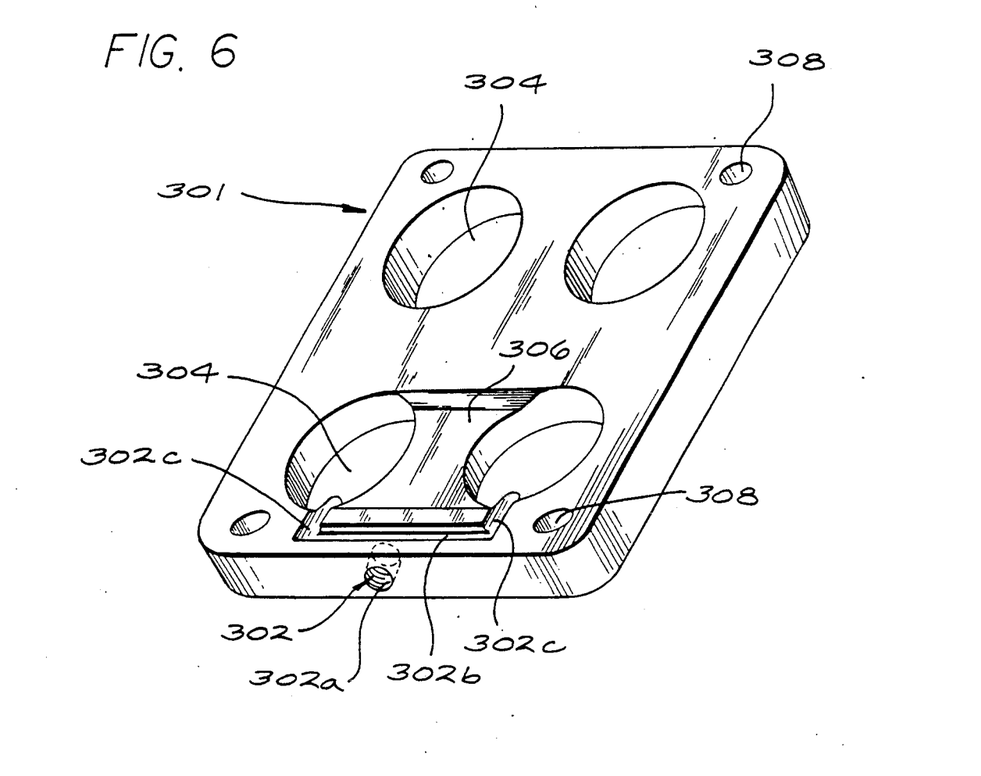
FIG. 6 is a perspective view of the present invention for use with a four barrel carburetor without an idle circuit.

The foregoing invention is also applicable to single barrelled and four-barrelled carburetor engines. In some older designed four-barrelled carburetors, emission control device 300 would have another set of through openings 304 connected to a second air passageway 306 and 302. Generally speaking in some older four-barrelled engines, an idle circuit is built into the rear throttles. Less fuel flows through this idle circuit so a lesser amount of air would pass through openings 302 in the secondary section 301. Nevertheless, the configuration of the present invention would merely be repeated in the secondary pair of throttle bores and this can be seen in FIG. 5. Newer four-barrel carburetors do not have a secondary idle circuit and would not necessarily need a repeat configuration on the secondary side. FIG. 6 is such an example.

In a one throttle or barrel carburetor engine, air passageway 306 would not be present. Opening 302 would merely pass into through opening 304 since that is the only opening. This is shown in FIG. 7. In a two-barrel, two-stage carburetor, passageway 306 would be present but air passageway 302b would not bifurcate into both openings. It would merely enter the top opening. FIG. 8 discloses this arrangement. This is because on the two-stage two-barrel engine, there is only one idle fuel point but two throttles.

Emission control device 300 may be made of cast aluminum, other suitable metals, or suitable plastics. The advantage of using plastic or aluminum is the ability to diecast or injection mold the emission control device 300.

The present invention should not be connected to a PCV valve.

It is believed that upper lip 302d which is of the same diameter as the diameter of 302c, helps to direct the fuel in a low vacuum condition in the engine. It is also believed that upper lip 302d facilitates directing the air flow directly under the fuel flow.

The present invention can be used with or without an EGR (Exhaust Gas Recirculation) plate normally placed underneath a carburetor.

In testing the present invention the following relationships were found most effective.

| 404 Diameter | 306 Approx. Depth |
|---|---|
| 1" | .100–.150" |
| 1¼" | .150–.200" |
| 1½" | .200–.250" |
| 1¾" | .250–.300" |

Insufficient depth of air passageways 306 will reduce the effectiveness of the device by failing to reduce emissions to the greatest degree. Too much depth reduces the effectiveness of the device by causing a lean condition during acceleration and/or increased loading on the engine. This too will fail to reduce emissions to the greatest degree.

| 404 diameter (in inches) | 302c approx. dimensions (in inches) |
|---|---|
| 1 | .1 × .175 |
| 1.25 | .2 × .2 |
| 1.5 | .25 × .25 |
| 1.75 | .3 × .3 |

If 302c is too small it reduces the effectiveness of the device by choking the air flow off and or slowing its velocity. If 302c is too large it diminishes the speed of the air entering through opening 304. The foregoing dimensions for 302c can vary as much as 30% in either direction.

The present invention was found to reduce toxic emissions and increase fuel efficiency.

The present invention is claimed as follows:

1. An emission control device for use with a carburetor having a base defining therein at least one opening and a fuel port, said fuel port opening into said opening, said device comprising:

a body member of predetermined thickness and having an upper surface, said body member having at least one through opening, said through opening communicating with said at least one opening in said base; and an air passageway defined in said upper surface of said body member to form an open indentation therein, said air passageway communicating through a single opening with one through opening and lying generally adjacent said base and said fuel port so that air passed through said air passageway passes into said through opening by first entering said through opening essentially directly under said fuel port such that fuel exiting said fuel port is essentially immediately mixed with the air passing through said air passageway.

2. The emission control device of claim 1, wherein said through opening is of greater diameter than said opening defined in said base.

3. The emission control device of claim 1, wherein said air passageway opens into said through opening and is angled toward the central axis of said through opening.

4. The emission control device of claim 2, wherein said air passageway extends into said through opening so it is at least in line with the outside edge of said opening in said base.

5. The emission control device of claim 1, wherein there are two through openings in said device and wherein lying between said two through openings is a second passageway in fluid communication with said two through openings, said second passageway being defined in the same surface of said device as said air passageways, said second passageway being an indentation in said surface, wherein air passing in said air passageway to said two through openings passes through said second passage way.

6. The emission control device of claim 1, wherein said second passageway is not wider than the diameter of said through openings.

7. The emission control device of claim 1, wherein the portion of said air passageway which communicates with said through opening has the smallest cross-sectional area of said air passageway.

8. The emission control device of claim 1, wherein said fuel passageway opening includes an idle port and an off idle port and wherein said air passageway passes under said idle and said off idle ports before entering said through opening.

9. The emission control device of claim 1, wherein said device is comprised of a bottom surface opposite said upper surface, said upper surface being directly in contact with said base of said carburetor.

10. The emission control device of claim 1, wherein as said air passageway enters said through opening it forms a venturi.

11. The emission control device of claim 1, wherein said air passageway is comprised of a through bore defined in a side of said device, under said upper surface and said open indentation in the surface of said device, the throughbore opening into said indentation and being in fluid communication therewith.

12. The emission control device of claim 1, wherein said through opening has a larger diameter than said opening defined in said base such that a ledge is formed between said opening in said base and said through opening.

13. The emission control device of claim 1, wherein said air passageway extends into said through opening, said extension being a lip.

14. The emission control device of claim 13, wherein said lip is comprised of a base and two opposing sides connected to said base.

15. The emission control device of claim 13, wherein said lip extends into said through opening and is parallel to said base.

16. The emission control device of claim 1, wherein the only vacuum drop in said air passageway occurs at the point where said air passageway opens into said through opening.

17. The emission control device of claim 13, wherein said lip angles toward said base.

18. The emission control device of claim 5, wherein said air passageway is comprised of a bore within the side of said emission control device and said indentation on the upper surface of said emission control device, said bore opening into said indentation and communicating therewith, said indentation passing into said two through openings and angling toward the central axes of said through openings, said bore being symmetrically arranged with respect to the central axes of said through openings.

19. The emission control device of claim 14, wherein said sides of said lip have their greatest heights near the outside periphery of said through opening and diminish to no height at the end of the extension of said air passageway into said through opening so that said side lips appear generally triangular in shape.

20. A carburetor having a base defining an opening of a first width; a fuel port in fluid communication with said opening; and having at said base and formed integrally with said base an emission control device, said device comprising at least one through opening of a second width, said second width being greater than said first width, said through opening communicating with said opening in said carburetor, said emission control device also having an air passageway, said air passageway communicating with said second opening and opening into said second opening under said fuel port.

21. The emission control device of claim 8, wherein said air passageway is positioned to open into said through opening at a point as close as possible to said idle port and off-idle port openings.

22. An emission control device for use with a carburetor having a base, said base defining therein an opening and a fuel port, said fuel port opening into said opening, said device comprising:
a body member of predetermined thickness and having an upper surface, said body member having at least one through opening, said through opening communicating with said at least one opening in said base, said through opening being of greater diameter than said opening defined in said base;
and an air passageway defined in said upper surface of said body member to form an indentation therein, said air passageway communicating through a single opening with said through opening and lying generally adjacent said base and said fuel port so that air passed through said air passageway passes into said through opening by first entering said through opening generally directly under said fuel port such that fuel exiting said fuel port is essentially immediately mixed with the air passing through said air passageway.

23. The emission control device of claim 22, wherein said through opening has a central axis and wherein said air passageway opening opens into said through opening and is angled toward said central axis.

24. The emission control device of claim 22, wherein said air passageway extends into said through opening so that said air passageway is at least in line with the outside edge of said opening in said carburetor.

25. The emission control device of claim 22, wherein there are two through openings in said device and wherein lying between said two through openings is a second passageway in fluid communication with said two through openings, said second passageway being defined in the same surface of said device as said air passageway, said second passageway being an indentation in said surface wherein air passing in said air passageway to said two through openings passes through said second passageway.

26. The emission control device of claim 25, wherein said second passageway is not wider than the diameter of said through openings.

27. The emission control device of claim 22, wherein the portion of said air passageway which communicates with said through opening has the smallest cross-sectional area of said air passageway.

28. The emission control device of claim 22, wherein said fuel port includes an idle port and an off idle port and wherein said air passageway passes under said idle and said off idle ports before entering said through opening.

29. The emission control device of claim 22, wherein said device is comprised of a bottom surface opposite said upper surface, said upper surface being directly in contact with said base of said carburetor.

30. The emission control device of claim 1, wherein said device is formed integrally with said carburetor.

31. The emission control device of claim 22, wherein said device is formed integrally with said carburetor.

32. The emission control device of claim 22, wherein as said air passageway enters said through opening it forms a venturi.

33. The emission control device of claim 22, wherein said air passageway is comprised of a through bore defined in a side of said emission control device, under said upper surface and said open indentation in the surface of said device, said through bore opening into said indentation and being in fluid communication therewith.

34. The emission control device of claim 22, wherein the differences in diameter between said through opening and said opening forms a ledge between said opening and said through opening.

35. The emission control device of claim 22, wherein said air passageway extends into said through opening, said extension being a lip.

36. The emission control device of claim 35, wherein said lip is comprised of a base and two opposing sides connected to said base.

37. The emission control device of claim 35, wherein said lip extends into said through opening and is parallel to said base.

38. The emission control device of claim 22, wherein the only vacuum drop in said air passageway occurs at the point where said air passageway opens into said through opening.

39. The emission control device of claim 35, wherein said lip angles toward said base.

40. The emission control device of claim 25, wherein said air passageway is comprised of a bore within the side of said emission control device and said indentation on the upper surface of said emission control device, said bore opening into said indentation and communicating therewith, said indentation passing into said two through openings and angling toward the central axes of said through openings, said bore being symmetrically arranged with respect to the central axes of said through openings.

41. The emission control device of claim 36, wherein said sides of said lip have their greatest heights near the outside periphery of said through opening and diminish to no height at the end of the extension of said air passageway into said through opening so that said side lips appear generally triangular in shape.

42. The emission control device of claim 28, wherein said air passageway is positioned to open into said through opening at a point as close as possible to said idle port and said off idle port openings.

* * * * *